United States Patent
Kang et al.

(10) Patent No.: US 10,266,692 B2
(45) Date of Patent: *Apr. 23, 2019

(54) AUTOMOBILE-USE THERMOPLASTIC RESIN COMPOSITION, AND AUTOMOBILE-USE MOLDED PRODUCT MANUFACTURED THEREFROM

(71) Applicant: LOTTE ADVANCED MATERIALS CO., LTD., Yeosu-si (KR)

(72) Inventors: Hyoungtaek Kang, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/533,047

(22) PCT Filed: Aug. 24, 2015

(86) PCT No.: PCT/KR2015/008831
§ 371 (c)(1),
(2) Date: Jun. 5, 2017

(87) PCT Pub. No.: WO2016/093465
PCT Pub. Date: Jun. 16, 2016

(65) Prior Publication Data
US 2017/0327687 A1   Nov. 16, 2017

(30) Foreign Application Priority Data

Dec. 9, 2014   (KR) .................. 10-2014-0175895

(51) Int. Cl.
*C08L 77/02* (2006.01)
*C08K 7/14* (2006.01)
*C08L 77/00* (2006.01)
*C08K 5/098* (2006.01)
*C08K 5/17* (2006.01)
*C08K 5/092* (2006.01)

(52) U.S. Cl.
CPC .............. *C08L 77/02* (2013.01); *C08K 5/092* (2013.01); *C08K 5/098* (2013.01); *C08K 5/175* (2013.01); *C08K 7/14* (2013.01); *C08L 77/00* (2013.01)

(58) Field of Classification Search
CPC ......... C08L 77/02; C08L 77/00; C08K 5/098; C08K 5/175; C08K 7/14; C08K 5/092
See application file for complete search history.

(56) References Cited

U.S. PATENT DOCUMENTS

| | | | |
|---|---|---|---|
| 4,602,058 | A | 7/1986 | Graham et al. |
| 8,618,209 | B2 | 12/2013 | Lee et al. |
| 2012/0196962 | A1 | 8/2012 | Kobayashi et al. |
| 2013/0197145 | A1 | 8/2013 | Thompson et al. |

FOREIGN PATENT DOCUMENTS

| | | |
|---|---|---|
| EP | 0392602 A1 | 10/1990 |
| JP | 61-502612 A | 11/1986 |
| JP | 4-050260 A | 2/1992 |
| JP | 05-043798 A | 2/1993 |
| JP | 2646743 B2 | 8/1997 |
| JP | 2007-246583 A | 9/2007 |
| KR | 10-2009-0038510 A | 4/2009 |
| KR | 10-2012-0089912 A | 8/2012 |
| WO | 1999-006484 A1 | 2/1999 |
| WO | 2012/106319 A2 | 8/2012 |
| WO | 2014/073219 A1 | 5/2014 |
| WO | 2016/093465 A1 | 6/2016 |

OTHER PUBLICATIONS

Office Action in counterpart Korean Application No. 10-2014-0175895 dated Apr. 27, 2017, pp. 1-6.
International Search Report in counterpart International Application No. PCT/KR2015/008831 dated Oct. 29, 2015, pp. 1-4.
Extended European Search Report in commonly owned European Application No. 15200507.0 dated May 3, 2016, 5 pages.
Extended European Search Report in commonly owned European Application No. 15169615.0 dated Aug. 12, 2015, pp. 1-5.
Office Action in commonly owned U.S. Appl. No. 14/723,745 dated May 9, 2016, pp. 1-8.
Final Office Action in commonly owned U.S. Appl. No. 14/723,745 dated Sep. 28, 2016, pp. 1-9.
Office Action in commonly owned U.S. Appl. No. 14/723,745 dated Jun. 6, 2017, pp. 1-10.
Office Action in commonly owned U.S. Appl. No. 14/972,300 dated Sep. 29, 2017, pp. 1-12.
Extended Search Report in counterpart European Application No. 15868630.3 dated Jun. 22, 2018, pp. 1-7.

*Primary Examiner* — John E Uselding
(74) *Attorney, Agent, or Firm* — Additon, Higgins & Pendleton, P.A.

(57) ABSTRACT

The present invention relates to an automobile-use thermoplastic resin composition, and an automobile-use molded product manufactured therefrom. The automobile-use thermoplastic resin composition comprises an aliphatic polyamide resin; a first chelating agent comprising an amino group and at least one of carboxylic acid and a salt thereof; a second chelating agent comprising a C1 to C10 (not including carboxyl group carbon) aliphatic polyvalent carboxylic acid having two to four carboxyl groups; and a filler.

7 Claims, No Drawings

AUTOMOBILE-USE THERMOPLASTIC RESIN COMPOSITION, AND AUTOMOBILE-USE MOLDED PRODUCT MANUFACTURED THEREFROM

CROSS-REFERENCE TO RELATED APPLICATIONS

This application claims priority to and the benefit of International Application No. PCT/KR2015/008831, filed Aug. 24, 2015, which published as WO 2016/093465 on Jun. 16, 2016; and Korean Patent Application No. 10-2014-0175895, filed in the Korean Intellectual Property Office on Dec. 9, 2014, the entire disclosure of each of which is incorporated herein by reference.

TECHNICAL FIELD

The present invention relates to an automotive thermoplastic resin composition, and, more particularly, a polyamide resin composition for automotive parts which has excellent long-term heat stability.

BACKGROUND ART

Polyamide resins are used in a wide range of fields such as electric parts, electronic parts, and automobile parts due to excellent properties thereof in terms of heat resistance, abrasion resistance, chemical resistance and flame retardancy.

Particularly, in the automobile industry, metal parts are being replaced with plastic parts in order to achieve weight reduction. In particular, peripheral parts of an engine compartment are exposed to a high temperature environment for a long time and thus are manufactured using polyamide resin compositions having excellent heat resistance.

As smaller engines are becoming more popular in the automobile industry, the number of automobiles employing a turbocharger is increasing to reduce fuel consumption. In an automobile employing a turbocharger, the temperature in the engine compartment rises greatly due to high output power. Thus, there has been a need to use a material having a higher level of heat resistance for parts in the engine compartment such that the parts can withstand a high temperature environment for a long time.

Generally, organic antioxidants such as phenol or phosphite-based antioxidants are widely used in order to secure high long-term heat stability of a polyamide resin composition. However, there is a limitation in maintaining excellent physical properties at high temperatures over a long period of time.

Copper halide heat stabilizers such as a CuI/KI mixture, which is known to have excellent long-term heat stability at high temperature as compared with organic antioxidants, have been used. However, copper is likely to discolor or precipitate over time, causing problems when used in electrical, electronic and automotive parts.

Therefore, there is a need for a polyamide resin composition which can retain high heat stability even when exposed to high temperature for a long time so as to be used for peripheral components of an engine room in an engine compartment of an automobile.

DISCLOSURE

Technical Problem

Embodiments of the present invention have been conceived to solve such a problem in the art and it is an object of the present invention to provide an automotive thermoplastic resin composition which has excellent long-term heat stability and processability and thus can retain mechanical strength for a long period of time.

Technical Solution

In accordance with one aspect of the present invention, there is provided an automotive thermoplastic resin composition, including: an aliphatic polyamide resin; a first chelating agent comprising at least one of a carboxylic acid or a salt thereof and an amino group; a second chelating agent comprising a $C_1$ to $C_{10}$ (excluding carbon atoms in a carboxyl group) aliphatic polycarboxylic acid having 2 to 4 carboxyl groups; and fillers.

The aliphatic polyamide resin may include at least one of polyamide 6 and polyamide 66.

The automotive thermoplastic resin composition may include: 30 wt % to 80 wt % of the aliphatic polyamide; 0.1 wt % to 1 wt % of the first chelating agent; 0.1 wt % to 5 wt % of the second chelating agent; and 10 wt % to 65 wt % of the fillers.

The automotive thermoplastic resin composition may include: 1 wt % to 20 wt % of the polyamide 6; 30 wt % to 70 wt % of the polyamide 66; 0.1 wt % to 1 wt % of the first chelating agent; 0.1 wt % to 5 wt % of the second chelating agent; and 10 wt % to 65 wt % of the fillers.

A weight ratio of the polyamide 6 to the polyamide 66 may range from 1:2 to 1:25.

The aliphatic polyamide resin may have a glass transition temperature (Tg) of 30° C. to 80° C.

The fillers may be glass fiber.

The first chelating agent may include at least one selected from the group consisting of ethylenediamine-N,N,N',N'-tetraacetic acid (EDTA), ethylene glycol bis(2-aminoethylether)-N,N,N',N'-tetraacetic acid (EGTA), trans-1,2-diaminocyclohexane-N,N,N',N'-tetraacetic acid (CyDTA), diethylene triamine pentaacetic acid (DTPA), triethylenetetraamine-N,N,N',N'',N''',N''''-hexaacetic acid (TETHA), N-(2-hydroxyethyl)ethylenediamine triacetic acid (HEDTA), and metal salts thereof.

The first chelating agent may include at least one metal ion selected from among sodium (Na), aluminum (Al), iron (Fe), copper (Cu), zinc (Zn), tin (Sn), titanium (Ti), nickel (Ni), antimony (Sb), magnesium (Mg), vanadium (V), chromium (Cr), and zirconium (Zr) ions.

The second chelating agent may be selected from the group consisting of fumaric acid, succinic acid, 3,3-diethylsuccinic acid, malonic acid, dimethylmalonic acid, tartaric acid, maleic acid, citric acid, malic acid, adipic acid, 2-methyladipic acid, tri-methyladipic acid, itaconic acid, glutaric acid, 2,2-dimethylglutaric acid, pimelic acid, azelaic acid, dimer acid, sebacic acid, suberic acid, decanedicarboxylic acid, dodecanedicarboxylic acid, citraconic acid, tetrahydrophthalic acid, 1,2,3,4-butanetetracarboxylic acid, oxalic acid, and combinations thereof.

In accordance with another aspect of the present invention, there is provided an automotive molded article fabricated using the automotive thermoplastic resin composition as set forth above.

The automotive molded article may satisfy Equation 1:

$$70 \leq \frac{a_1}{a_0} \times 100 \leq 110 \qquad \text{[Equation 1]}$$

(wherein $a_0$ denotes an initial tensile strength of the molded article, as measured in accordance with ASTM D638, and $a_1$ denotes a tensile strength of the molded article after storage of the molded article at 220° C. for 500 hours).

The automotive molded article may satisfy Equation 2:

$$80 \leq \frac{a_2}{a_0} \times 100 \leq 110 \quad \text{[Equation 2]}$$

(wherein $a_0$ denotes an initial tensile strength of the molded article, as measured in accordance with ASTM D638, and $a_1$ denotes a tensile strength of the molded article after storage of the molded article at 220° C. for 1,000 hours).

The automotive molded article has a volatile matter of 200 ppm to 800 ppm, as determined through a procedure in which 5 g of the molded article is weighed in a Petri dish, followed by covering the dish with a dish cap, and then the dish is placed on a hot plate at 330° C. for 2 hours, followed by measurement of the amount of volatile matter adsorbed on the dish cap.

The automotive molded article may be at least one of components in an engine compartment.

The automotive molded article may be a battery fuse, a turbo resonator, or an intercooler tank.

Advantageous Effects

The present invention provides an automotive thermoplastic resin composition which can retain initial properties at high temperature for a long time and have excellent long-term heat stability.

In addition, the automotive thermoplastic resin composition generates a small quantity of gas during processing thereof, thereby having high processability.

It should be understood that the present invention is not limited to the aforementioned effects and other effects can be clearly understood by those skilled in the art from the appended claims.

BEST MODE

The above and other objects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims. Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having meanings that are consistent with their meaning in the context of the specification and relevant art and should not be interpreted in an idealized or overly formal sense unless expressly so defined herein.

Hereinafter, an automotive thermoplastic resin composition according to embodiments of the present invention will be described.

An automotive thermoplastic resin composition according to one embodiment of the present invention includes an aliphatic polyamide resin, a chelating agent and fillers, wherein the chelating agent may include a first chelating agent and a second chelating agent.

Herein, 'first chelating agent' and 'second chelating agent' are used to refer to different types of chelating agents and are not to be construed in any way as limiting the present invention.

Now, each component of the automotive thermoplastic resin composition according to this embodiment of the present invention will be described in detail.

Aliphatic Polyamide Resin

The aliphatic polyamide resin is a polyamide having no aromatic ring in a molecular chain and may contain a $C_{10}$ to $C_{20}$ aliphatic group.

The aliphatic polyamide resin may be a homopolymer, a copolymer, a ternary copolymer or a higher order polymer formed from aminocarboxylic acid, lactam or diamine, and dicarboxylic acid, and, the term "copolymer", as used herein, refers to a polyamide having two or more amide and/or diamide repeat units.

The aminocarboxylic acid may be a $C_6$ to $C_{12}$ aminocarboxylic acid, specifically, 6-aminocaproic acid, 7-aminoheptanoic acid, 9-Aminononanoic acid, 11-aminoundecanoic acid, or 12-aminododecanoic acid.

The lactam may be a $C_4$ to $C_{12}$ lactam, specifically, α-pyrrolidone, ε-caprolactam, ω-laurolactam, or ε-enantolactam.

The diamine may be an aliphatic or alicyclic diamine, specifically, tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, bis(p-aminocyclohexyl)methane, 2-methyloctamethylenediamine, trimethylhexamethylenediamine, 1,8-diaminooctane, 1,9-diaminononane, 1,10-diaminodecane, 1,12-diaminododecane, or m-xylylenediamine.

The dicarboxylic acid may be an aliphatic or alicyclic dicarboxylic acid, specifically, adipic acid, 2-methyladipic acid, trimethyladipic acid, glutaric acid, 2,2-dimethylglutaric acid, pimelic acid, suberic acid, azelaic acid, sebacic acid, dodecanedioic acid, 1,4-cyclohexane dicarboxylic acid, malonic acid, dimethyl malonic acid, succinic acid, or 2,2-diethyl succinic acid.

The aliphatic polyamide resin may be polyamide 6, polyamide 66, polyamide 46, polyamide 610, polyamide 612, polyamide 11, polyamide 12, polyamide 910, polyamide 912, polyamide 913, polyamide 914, polyamide 915, polyamide 616, polyamide 936, polyamide 1010, polyamide 1012, polyamide 1013, polyamide 1014, polyamide 1210, polyamide 1212, polyamide 1213, polyamide 1214, polyamide 614, polyamide 613, polyamide 615, polyamide 616, or polyamide 613. These polyamide resins may be used alone or as a mixture thereof, as needed.

Preferably, the aliphatic polyamide resin is polyamide 6 or polyamide 66, more preferably a mixture of polyamide 6 and polyamide 66.

The aliphatic polyamide resin may be present in an amount of 30 wt % to 80 wt % based on the total weight of the aliphatic polyamide resin, the first chelating agent, the second chelating agent, and the fillers.

When a mixture of polyamide 6 and polyamide 66 is used as the aliphatic polyamide resin, the polyamide 6 and the polyamide 66 may be used in amounts of 1 wt % to 20 wt % and 30 wt % to 70 wt %, respectively, based on the total weight of the aliphatic polyamide resin, the first chelating agent, the second chelating agent, and the fillers.

In addition, a weight ratio of the polyamide 6 to the polyamide 66 may range from 1:2 to 1:25, preferably 1:4 to 1:15.

When the amounts of the polyamide 6 and the polyamide 66 and the weight ratio of the polyamide 6 to the polyamide 66 are outside the aforementioned ranges, the thermoplastic resin composition can have poor long-term heat stability or processability.

The aliphatic polyamide resin may have a glass transition temperature (Tg) of 30° C. to 80° C., preferably 35° C. to 50° C. In addition, the aliphatic polyamide resin may have a melting point of 160° C. to 230° C. When the glass transition temperature and melting point of the aliphatic polyamide resin fall within these ranges, the thermoplastic resin composition can have good impact strength and processability.

Preferably, the aliphatic polyamide resin has a number average molecular weight (Mn) of 10,000 g/mol to 200,000 g/mol, more preferably 20,000 g/mol to 150,000 g/mol, without being limited thereto.

Chelating Agent

The automotive thermoplastic resin composition may include two types of chelating agents including the first chelating agent and the second chelating agent.

First Chelating Agent

The first chelating agent may include: at least one of a carboxylic acid or a salt thereof; and an amino group.

The first chelating agent is a compound having a functional group capable of forming a bond with a metal ion, and can be bonded to cations of a metal salt dissociated into cations and anions to form a stabilized chelate complex.

The first chelating agent may include compounds having a polycarboxyl group, wherein the compounds may be used alone or as a mixture thereof. Specifically, the first chelating agent is polycarboxylic acid or a carboxylate group-containing compound, and may be a compound containing a functional group represented by Formula 1a, 1b, or 1c:

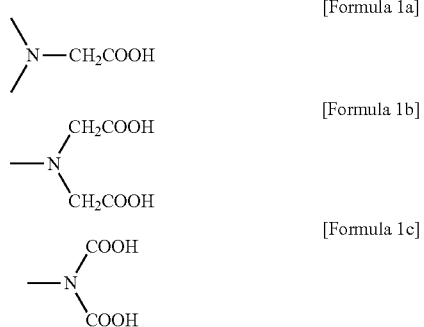

Examples of the compound containing a functional group represented by Formula 1a, 1b, or 1c may include ethylenediamine-N,N,N',N'-tetraacetic acid (EDTA), ethylene glycol bis(2-aminoethylether)-N,N,N',N'-tetraacetic acid (EGTA), trans-1,2-diaminocyclohexane-N,N,N',N'-tetraacetic acid (CyDTA), diethylene triamine pentaacetic acid (DTPA), triethylenetetraamine-N,N,N',N'',N''',N''''-hexaacetic acid (TETHA), N-(2-hydroxyethyl)ethylenediamine triacetic acid (HEDTA), and metal salts thereof. These compounds may be used as a mixture thereof.

In the first chelating agent, the metal ion forming the bond may be at least one selected from among sodium (Na), aluminum (Al), iron (Fe), copper (Cu), zinc (Zn), tin (Sn), titanium (Ti), nickel (Ni), antimony (Sb), magnesium (Mg), vanadium (V), chromium (Cr), zirconium (Zr) ions. It should be understood that the metal ion used in the first chelating agent according to the present invention is not limited thereto, and any metal ion exhibiting the same effect may be used. Preferably, the first chelating agent is ethylenediamine tetraacetic acid-disodium salt (EDTA-2Na).

The first chelating agent may be present in an amount of 0.1 wt % to 1 wt %, preferably 0.5 wt % to 0.9 wt %, based on the total weight of the aliphatic polyamide resin, the first chelating agent, the second chelating agent, and the fillers. If the amount of the first chelating agent is less than 0.1 wt %, improvement in long-term heat stability of the thermoplastic resin composition is insignificant, whereas, if the amount of the first chelating agent exceeds 1 wt %, gas generation increases during preparation of the thermoplastic resin composition, causing deterioration in processability, while the thermoplastic resin composition can have poor mechanical strength and is likely to discolor.

Second Chelating Agent

The second chelating agent may include a $C_1$ to $C_{10}$ (excluding carbon atoms in a carboxyl group) aliphatic polycarboxylic acid having two to four carboxyl groups. Specifically, the second chelating agent may include a mixture of different types of aliphatic polycarboxylic acids, and derivatives thereof such as acid anhydrides, acid chlorides, and esters thereof.

Examples of the second chelating agent may include fumaric acid, succinic acid, 3,3-diethylsuccinic acid, malonic acid, dimethylmalonic acid, tartaric acid, maleic acid, citric acid, malic acid, adipic acid, 2-methyladipic acid, tri-methyladipic acid, itaconic acid, glutaric acid, 2,2-dimethylglutaric acid, pimelic acid, azelaic acid, dimer acid, sebacic acid, suberic acid, decanedicarboxylic acid, dodecanedicarboxylic acid, citraconic acid, tetrahydrophthalic acid, 1,2,3,4-butanetetracarboxylic acid, and oxalic acid. These compounds may be used alone or as a mixture thereof.

It should be understood that the aliphatic polycarboxylic acid used as the second chelating agent according to the present invention is not limited thereto, and any aliphatic polycarboxylic acid exhibiting the same effect may be used. Preferably, the second chelating agent is citric acid.

The second chelating agent may be present in an amount of 0.1 wt % to 5 wt % based on the total weight of the aliphatic polyamide resin, the first chelating agent, the second chelating agent, and the fillers. Within this range, the second chelating agent can stably increase long-term heat stability of the thermoplastic resin composition in cooperation with the first chelating agent.

The first chelating agent and the second chelating agent oxidize a surface of the resin composition during aging at high temperature to promote char formation on the surface. As a result, it is possible to prevent penetration of an oxide layer into the thermoplastic resin to prevent decomposition of the thermoplastic resin, thereby improving long-term heat stability of the thermoplastic resin.

Fillers

The automotive thermoplastic resin composition includes fillers. A desired level of mechanical strength can be secured by adjusting the amount of the fillers.

Preferably, the fillers include glass fiber.

The glass fiber may be any suitable glass fiber known in the art, and may have a diameter of 8 μm to 20 μm and a length of 1.5 mm to 8 mm. Within this range of diameter, the glass fiber can reinforce the thermoplastic resin composition. In addition, within this range of length, the glass fiber can be easily introduced into a processing machine such as an extruder and further reinforce the thermoplastic resin composition.

The glass fiber may be used in combination with fibers selected from the group consisting of carbon fiber, basalt fiber, fibers produced from biomass, and combinations thereof. Herein, the term "biomass" refers organic matter from plants or microorganisms.

The glass fiber may have a circular, elliptical, rectangular, or dumbbell shape having two circles connected to each other in cross-section.

The glass fiber may have a cross-sectional aspect ratio of less than 1.5. Specifically, the glass fiber may have a circular cross-sectional shape and thus have a cross-sectional aspect ratio of 1. Herein, the aspect ratio is defined as a ratio of the longest diameter to the smallest diameter in the cross section of the glass fiber. When the glass fiber has an aspect ratio falling within the aforementioned arrange, it is possible to reduce product cost. Particularly, the glass fiber having a circular cross-sectional shape can improve dimensional stability and appearance of a product fabricated using the thermoplastic resin composition.

In order to prevent reaction between the glass fiber and a resin and improve the degree of impregnation, the glass fiber can be surface-treated with a predetermined sizing material. Here, surface treatment of the glass fiber may be performed at the time of producing the glass fiber or in a post-process.

In addition, the fillers can further improve long-term heat stability of the thermoplastic resin composition in cooperation with the second chelating agent.

By way of example, when glass fiber is used as the filler, hair-like filaments may be subjected to surface treatment for coating surfaces of the filaments with the sizing material during fabrication of the glass fiber. For example, the sizing material is used to protect the filaments from friction throughout the glass fiber fabrication process or to facilitate bonding between of the glass fiber and a resin.

The first chelating agent and the second chelating agent can react with the sizing material of the glass fiber, thereby improving long-term heat stability of the thermoplastic resin composition.

The strength of the glass fiber may vary depending on the structure of a silicate network. Alkali oxide of the glass fiber is not easily incorporated into the silicate network structure, causing reduction in strength. However, when the first chelating agent and the second chelating agent are used together, as in the present invention, the first chelating agent and the second chelating agent are bonded to the sizing material of the glass fiber to inhibit action of the alkali oxide, such that the strength of the thermoplastic resin composition can be maintained even when the resin composition is exposed to high temperature for a long time.

The fillers may be present in an amount of 10 wt % to 65 wt % based on the total weight of the aliphatic polyamide resin, the first chelating agent, the second chelating agent, and the fillers.

In one embodiment, the automotive thermoplastic resin composition may further include additives, as needed.

The additives may include dyes, pigments, heat stabilizers, UV stabilizers, lubricants, antibacterial agents, releasing agents, nucleating agents, antistatic agents, antioxidants, and inorganic additives, without being limited thereto. These additives may be used alone or as a mixture thereof.

The automotive thermoplastic resin composition according to the present invention can have good impact strength and processability by including the aliphatic polyamide resin, and have good long-term heat stability by including the first chelating agent and the second chelating agent without deterioration in other properties of the aliphatic polyamide resin, such as abrasion resistance, chemical resistance, flame retardancy, and mechanical strength.

The automotive thermoplastic resin composition according to the present invention may be prepared by a typical method known in the art. For example, the components of the resin composition according to the present invention, and, optionally, the additives may be mixed, followed by melt extrusion in an extruder, thereby preparing the resin composition in pellet form.

The automotive thermoplastic resin composition according to the present invention may be used for any molded article requiring heat resistance.

A molded article according to one embodiment of the present invention has excellent long-term heat stability, and may satisfy Equation 1:

$$70 \le \frac{a_1}{a_0} \times 100 \le 110 \qquad \text{[Equation 1]}$$

(wherein $a_0$ denotes an initial tensile strength of the molded article, as measured in accordance with ASTM D638, and $a_1$ denotes a tensile strength of the molded article after storage of the molded article at 220° C. for 500 hours).

In addition, the molded article may satisfy Equation 2:

$$80 \le \frac{a_2}{a_0} \times 100 \le 110 \qquad \text{[Equation 2]}$$

(wherein $a_0$ denotes an initial tensile strength of the molded article, as measured in accordance with ASTM D638, and $a_1$ denotes a tensile strength of the molded article after storage of the molded article at 220° C. for 1,000 hours).

The molded article has good processability and may have a volatile matter of 200 ppm to 800 ppm, preferably 250 ppm to 700 ppm, as determined through a procedure in which 5 g of the molded article is weighed in a Petri dish, followed by covering the dish with a dish cap, and then the dish is placed on a hot plate at 330° C. for 2 hours, followed by measurement of the amount of volatile matter adsorbed on the dish cap.

Specifically, the molded article may be used for a water temperature controller, a thermostat housing, and a fuel rail, without being limited thereto.

Example

Next, results of experiments conducted to demonstrate effects of the automotive thermoplastic resin composition according to the present invention will be shown.

Details of components used in the following Examples and Comparative Examples are as follows:

(a) Aliphatic polyamide resin
(a-1) Polyamide 6, Zig Sheng TP 4208.
(a-2) Polyamide 66 (Vydyne, Ascend Performance Materials Operations LLC.)
(b) Chelating agent
(b-1) First chelating agent: EDTA-2Na (Dow Chemical)
(b-2) Second chelating agent: Citric acid anhydride (Samchun Pure Chemical Co., Ltd.)
(c) Filler
Glass fiber (983, Owens Corning Corporation, diameter: 10 μm, chop length: 4 mm, cross-sectional shape: ellipse)
(d) Heat stabilizer
CuI/KI mixture (TP-H9008, Brueggemann Chemical)

The aforementioned components were introduced into a mixer in amounts as listed in Table 1, followed by dry mixing. Then, the mixture was subjected to extrusion in a twin-screw extruder (L/D: 45, φ: 44 mm), thereby preparing a thermoplastic resin composition in pellet form. The prepared pellets were subjected to injection molding using a 10 oz. injection machine at 280° C., thereby preparing a specimen for property evaluation.

In Table 1, the amount of each component is represented in % by weight.

TABLE 1

| | | Component | | | | | |
|---|---|---|---|---|---|---|---|
| | | (a-1) | (a-2) | (b-1) | (b-2) | (c) | (d) |
| Example | 1 | 5 | 58.5 | 0.5 | 1 | 35 | — |
| | 2 | 5 | 57.5 | 0.5 | 2 | 35 | — |
| | 3 | 10 | 53.5 | 0.5 | 1 | 35 | — |
| | 4 | 10 | 52.5 | 0.5 | 2 | 35 | — |
| | 5 | 5 | 58.5 | 0.9 | 1 | 35 | — |
| | 6 | 5 | 54.5 | 0.5 | 5 | 35 | — |
| Comparative | 1 | — | 64.8 | — | — | 35 | 0.2 |
| Example | 2 | — | 63.5 | 0.5 | 1 | 35 | — |
| | 3 | — | 62.5 | 0.5 | 2 | 35 | — |
| | 4 | 65 | — | — | — | 35 | — |
| | 5 | 25 | 38.5 | 0.5 | 1 | 35 | — |
| | 6 | 2 | 61.5 | 0.5 | 1 | 35 | — |
| | 7 | 5 | 57 | 2 | 1 | 35 | — |
| | 8 | 5 | 52.5 | 0.5 | 7 | 35 | — |
| | 9 | 5 | 59.5 | 0.5 | — | 35 | — |
| | 10 | 5 | 59 | — | 1 | 35 | — |

The thermoplastic resin compositions prepared in Examples 1 to 6 and Comparative Examples 1 to 10 were evaluated as to long-term heat stability and gas generation according to the following methods. Results are shown in Table 2.

<Long-Term Heat Stability>

(1) Each of the specimens prepared using the thermoplastic resin compositions of Examples 1 to 6 and Comparative Examples 1 to 10 was allowed to stand at 23° C. and 50% RH for 48 hours, followed by measurement of initial tensile strength ($a_0$) in accordance with ASTM D638. Here, the tensile strength was measured at a tensile rate of 5 mm/min. Then, each of the specimens was allowed to stand at 220° C. for 500 hours, followed by measurement of the tensile strength ($a_1$) of each specimen (Comparative Example 4 was excluded from the evaluation because Polyamide 6 (a-1) had a melting point of 220° C., and the tensile strength of the specimen of Comparative Example 4 was unmeasurable). Long-term heat stability of each of the specimens was evaluated using a tensile strength retention rate as calculated according to Equation 3:

$$\frac{a_1}{a_0} \times 100 (\%) \quad \text{[Equation 3]}$$

(2) Each of the specimens prepared using the thermoplastic resin compositions of Examples 1 to 6 and Comparative Examples 1 to 10 was allowed to stand at 23° C. and 50% RH for 48 hours, followed by measurement of initial tensile strength ($a_0$) in accordance with ASTM D638. Here, the tensile strength was measured at a tensile rate of 5 mm/min. Then, each of the specimens was allowed to stand at 220° C. for 1,000 hours, followed by measurement of the tensile strength ($a_2$) of each specimen (Comparative Example 4 was excluded from evaluation because Polyamide 6 (a-1) has a melting point of 220° C., and the tensile strength of the specimen of Comparative Example 4 was unmeasurable). Long-term heat stability of each of the specimens was evaluated using a tensile strength retention rate as calculated according to Equation 4.

$$\frac{a_2}{a_0} \times 100 (\%) \quad \text{[Equation 4]}$$

<Gas Generation>

5 g of a pellet specimen prepared using each of the thermoplastic resin compositions of Examples 1 to 6 and Comparative Examples 1 to 10 was weighed in a Petri dish, followed by covering the dish with a dish cap, and then the dish was placed on a hot plate at 330° C. for 2 hours, followed by measurement of the amount of volatile matter adsorbed on the dish cap (Comparative Example 4 was excluded from the evaluation because Polyamide 6 (a-1) has a melting point of 220° C. and the gas generation amount of the specimen of Comparative Example 4 was unmeasurable). Gas generation of each of the specimens was evaluated according to Equation 5:

$$\frac{C - C_0}{S} \times 10^6 (ppm) \quad \text{[Equation 5]}$$

(wherein C denotes a weight of the dish cap after evaluation, $C_0$ denotes a weight of the dish cap before evaluation, and S denotes a weight of the pellet specimen.)

TABLE 2

| | | Long-term heat resistance (1) | | | Long-term heat resistance (2) | | | |
| --- | --- | --- | --- | --- | --- | --- | --- | --- |
| | | Initial tensile strength (kg/cm$^2$) | Tensile strength after 500 hours (kg/cm$^2$) | Tensile strength retention rate after 500 hours (%) | Initial tensile strength (kg/cm$^2$) | Tensile strength after 1,000 hours (kg/cm$^2$) | Tensile strength retention rate after 1,000 hours (%) | Gas generation amount |
| Example | 1 | 1899 | 1947 | 103 | 1899 | 1577 | 83 | 330 |
| | 2 | 1918 | 1897 | 99 | 1918 | 1726 | 90 | 460 |
| | 3 | 1817 | 1811 | 105 | 1817 | 1544 | 85 | 520 |
| | 4 | 1781 | 1727 | 97 | 1781 | 1639 | 92 | 610 |
| | 5 | 1901 | 1806 | 95 | 1901 | 1635 | 86 | 310 |
| | 6 | 1922 | 1884 | 98 | 1822 | 1634 | 85 | 650 |
| Comparativ Example | 1 | 2132 | 1101 | 52 | 2132 | 536 | 25 | 230 |
| | 2 | 2107 | 1197 | 57 | 2107 | 615 | 29 | 350 |
| | 3 | 2000 | 1234 | 62 | 2000 | 628 | 31 | 440 |
| | 4 | 1821 | Unmeasurable | — | 1821 | Unmeasurable | — | Unmeasurable |
| | 5 | 1765 | 1677 | 95 | 1765 | 1482 | 84 | 1350 |
| | 6 | 2008 | 1104 | 55 | 2008 | 623 | 31 | 370 |
| | 7 | 1858 | 1802 | 97 | 1858 | 1560 | 84 | 1080 |
| | 8 | 1779 | 1619 | 91 | 1779 | 1459 | 82 | 1770 |
| | 9 | 1993 | 1156 | 58 | 1993 | 638 | 32 | 420 |
| | 10 | 1828 | 1042 | 57 | 1828 | 548 | 30 | 510 |

As shown in Table 2, the thermoplastic resin compositions of Examples 1 to 6 were excellent in mechanical properties such as long-term heat stability and generated a small quantity of gas, thereby having excellent processability.

In addition, it can be seen that the thermoplastic resin composition including a typical heat stabilizer, i.e., a copper halide compound (Comparative Example 1) had considerably low long-term heat resistance, as compared with the thermoplastic resin compositions of Examples.

Further, the thermoplastic resin compositions including a single type of aliphatic polyamide (Comparative Examples 2 and 3) exhibited considerably low tensile strength retention rate, as compared with the thermoplastic resin compositions of Examples. Thus, it can be seen that the thermoplastic resin compositions of Examples including two types of aliphatic polyamides in specific amounts have high tensile strength even when exposed to high temperature for a long time.

Moreover, it can be seen that the thermoplastic resin compositions of Comparative Examples 5 and 6 in which polyamide 6 and polyamide 66 were used together as the aliphatic polyamide and the content ratio between the polyamides was outside the range according to the present invention had remarkably low long term heat resistance or generated a large quantity of gas and thus exhibited poor processability.

In addition, it can be seen that the thermoplastic resin compositions including a single chelating agent (Comparative Examples 9 and 10) exhibited considerably low tensile strength retention rate both after storage for 500 hours and after storage for 1,000 hours, and the thermoplastic resin compositions in which two types of chelating agents were used and the content ratio between the chelating agents was outside the range according to the present invention (Comparative Examples 7 and 8) generated a large quantity of gas and thus had considerably poor processability.

Therefore, it can be seen that the kind and content of the aliphatic polyamide, and the kind and content of the chelating agent are significant factors in long-term heat resistance and processability of the thermoplastic resin composition according to the present invention.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

INDUSTRIAL APPLICABILITY

The automotive thermoplastic resin composition according to the present invention has excellent long-term heat stability and thus can retain high heat stability even when exposed to high temperature for a long time so as to be used for peripheral components in an engine compartment of an automobile.

The invention claimed is:

1. An automotive thermoplastic resin composition, comprising:
   1 wt % to 20 wt % of polyamide 6;
   30 wt % to 70 wt % of polyamide 66;
   0.1 wt % to 0.9 wt % of a first chelating agent comprising ethylenediamine-N,N,N',N'-tetraacetic acid (EDTA) and/or a salt thereof;
   0.1 wt % to 5 wt % of a second chelating agent comprising citric acid and/or an anhydride thereof; and
   10 wt % to 65 wt % of fillers,
   wherein a specimen produced from the automotive thermoplastic resin composition using an injection molding machine at 280° C. satisfies Equation 1:

$$70 \leq \frac{a_1}{a_0} \times 100 \leq 110$$

wherein $a_0$ denotes an initial tensile strength of the specimen, as measured in accordance with ASTM D638, and $a_1$ denotes a tensile strength of the specimen after storage of the specimen at 220° C. for 500 hours, wherein the specimen has a volatile matter of 200 ppm to 800 ppm, as determined through a procedure in which 5 g of the specimen is weighed in a Petri dish, followed by covering the dish with a dish cap, and then the dish is placed on a hot plate at 330° C. for 2 hours, followed by measurement of the amount of volatile matter adsorbed on the dish cap, and wherein the specimen produced from the automotive thermoplastic resin composition using an injection molding machine at 280° C. also satisfies Equation 2:

$$80 \leq \frac{a_2}{a_0} \times 100 \leq 110$$

wherein $a_0$ denotes an initial tensile strength of the specimen, as measured in accordance with ASTM D638, and $a_2$ denotes a tensile strength of the specimen after storage of the specimen at 220° C. for 1,000 hours.

2. The automotive thermoplastic resin composition according to claim 1, wherein a weight ratio of the polyamide 6 to the polyamide 66 ranges from 1:2 to 1:25.

3. The automotive thermoplastic resin composition according to claim 1, wherein the polyamide 6 and/or polyamide 66 has a glass transition temperature (Tg) of 30° C. to 80° C.

4. The automotive thermoplastic resin composition according to claim 1, wherein the fillers are glass fiber.

5. The automotive thermoplastic resin composition according to claim 1, wherein the first chelating agent comprises at least one metal ion selected from the group consisting of sodium (Na), aluminum (Al), iron (Fe), copper (Cu), zinc (Zn), tin (Sn), titanium (Ti), nickel (Ni), antimony (Sb), magnesium (Mg), vanadium (V), chromium (Cr), and zirconium (Zr) ions.

6. An automotive molded article fabricated using the automotive thermoplastic resin composition according to claim 1.

7. The automotive molded article according to claim 6, wherein the automotive molded article is a water temperature controller, a thermostat housing, and/or a fuel rail.

* * * * *